May 26, 1970 J. V. MAHON Re. 26,895

RECLOSABLE FOLDING CARTON

Original Filed Oct. 26, 1967

INVENTOR
JOHN V. MAHON
BY Richard W. Carpenter
ATTORNEY

United States Patent Office

Re. 26,895
Reissued May 26, 1970

26,895

RECLOSABLE FOLDING CARTON

John V. Mahon, Lansdale, Pa., assignor to Container Corporation of America, Chicago, Ill., a corporation of Delaware Original No. 3,438,566, dated Apr. 15, 1969, Ser. No. 678,436, Oct. 26, 1967. Application for reissue May 21, 1969, Ser. No. 830,905
Int. Cl. B65d *5/59, 5/70*
U.S. Cl. 229—51 9 Claims

Matter enclosed in heavy brackets [ ] appears in the original patent but forms no part of this reissue specification; matter printed in italics indicates the additions made by reissue.

ABSTRACT OF THE DISCLOSURE

A paperboard folding carton having a plurality of walls joined to form a box-like structure having an opening on one side and a pair of inner and outer panels hinged to opposite walls and folded into overlapped relation to close the opening, one of the panels having a partially detachable tab which is insertable between a pair of tabs on the other panel to effect a reclosure of the carton.

This invention relates to reclosable folding paperboard cartons and more particularly to an improved closure panel arrangement for opening and reclosing the carton.

An object of the invention is the provision, in a carton of the type described, of a pair of overlapping closure panels which are glued together in certain areas and which have other unglued areas defining reclosure tabs.

A more specific object of the invention is to provide, in a carton of the type described, an inner closure panel with a pair of opposed tabs cut therefrom and hinged thereto with abutting free forward edges and an outer closure panel with a tab which is partially detached upon opening of the carton and which has a portion which is insertable between the abutting edges of the tabs of the inner closure panel upon reclosure of the carton.

These and other objects of the invention will be apparent from an examination of the following description and drawings, wherein.

Figure 3:
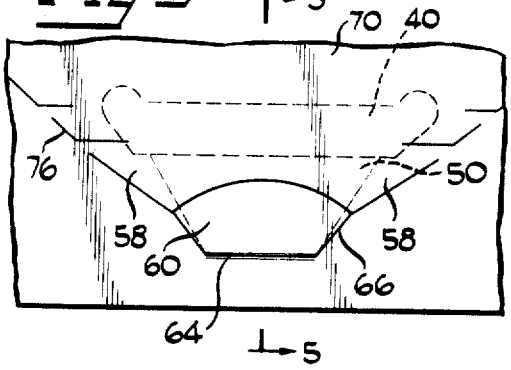
FIGURE 3 is an enlarged fragmentary plan view of the portion of the structure illustrated in FIGURE 2 showing the closure panels after they have been initially closed and sealed.
Figure 4:
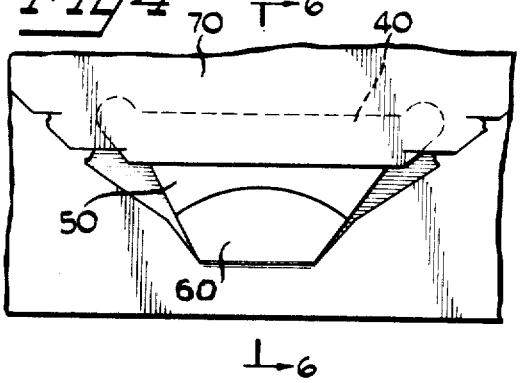
FIGURE 4 is view similar to FIGURE 3 but showing the closure panels after the carton has been opened initially and then reclosed.
Figure 5:
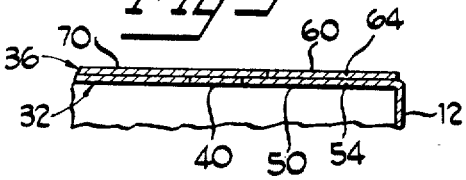
Figure 6:
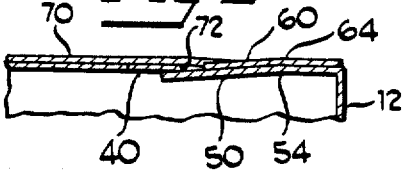
Figure 7:
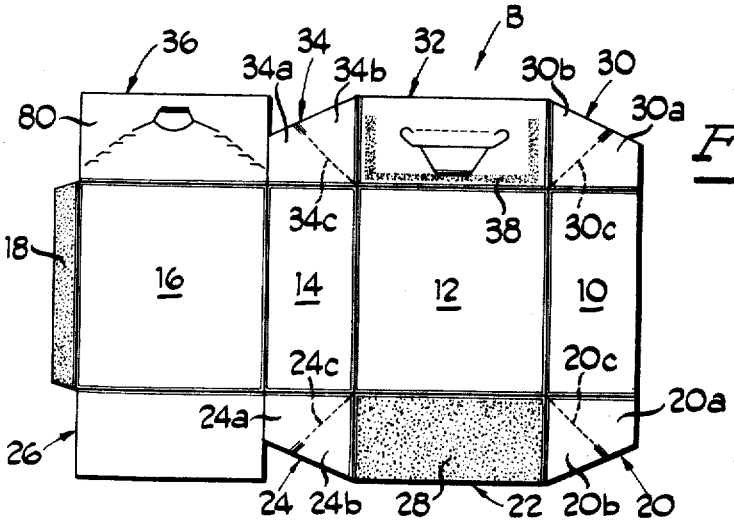

FIGURES 5 and 6 are fragmentary sections taken on lines 5—5 and 6—6 of FIGURES 3 and 4, respectively, and FIGURE 7 is a plan view of the blank from which the carton illustrated in the other views may be formed.

It will be understood that, for purposes of clarity, certain elements have been intentionally omitted from certain views where they are believed to be illustrated to better advantage in other views.

Figure 1:
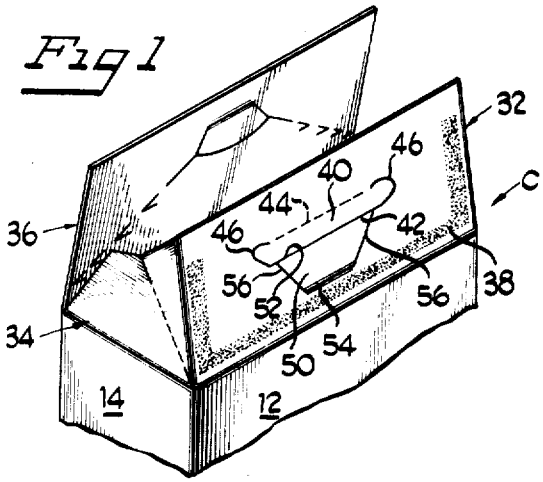
FIGURE 1 is a perspective view of a portion of a paperboard carton having closure panels embodying features of the invention, as seen before the closure panels have been initially closed and sealed.
Figure 2:
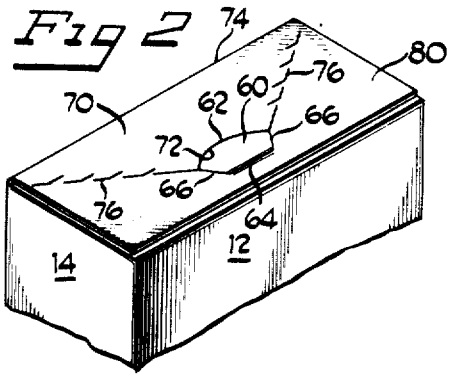
FIGURE 2 is a view similar to FIGURE 1 but showing the panels after they have been initially closed and sealed.

Referring now to the drawings for a better understanding of the invention, and particularly to FIGURES 1 and 7, it will be seen that the carton, indicated generally at C, in FIGURE 1, may be formed from the unitary blank B of foldable paperboard illustrated in FIGURE 7.

Still referring to FIGURES 1 and 7 will be seen that carton C includes a first minor side wall 10, a first major side wall 12, a second minor side wall 14, a second major side wall 16, and a glue strip 18, which are serially interconnected to form a tubular structure open at opposite ends.

One end, the bottom as shown in FIGURE 7, may be closed by a plurality of end closure flaps and panels 20, 22, 24, and 26 which are hingedly attached to the lower edges of side walls 10, 12, 14, and 16, respectively.

Flap 20 is preferably in the form of a bellows having a pair of sections of gusset portion 20a and 20b which are hingedly attached to side wall 10 and panel 28, respectively and which are hingedly attached to each other along a diagonal fold line 20c. Likewise, flap 24 is of the same type and comprises a pair of sections 24a and 24b which are hingedly attached to side wall 14 and panel 28, respectively, and to each other along diagonal fold line 24c.

The opposite end of the container is provided with generally similar closure flaps and closure panels which, as best seen in FIGURE 7, comprise flap 30, panel 32, flap 34, and panel 36 which are hingedly attached to the side walls 10, 12, 14, and 16, respectively.

Flaps 30 and 34 are formed in the same manner as flaps 20 and 24. Flap 30 includes sections 30a and 30b which are hingedly attached to side wall 10 and panel 32, respectively, and to each other along a diagonal fold line 30c. Likewise, flap 34 comprises sections 34a and 34b which are hingedly attached to side wall 14 and panel 32, respectively, and to each other on a diagonal fold line 34c.

Still referring to FIGURES 1 and 7, and particularly to the inner and outer closure panels 32 and 36, respectively, which represent the novel feature of the invention, it will be seen that inner closure panel 32 has cut therefrom and formed therein a pair of integral first and second locking tabs 40 and 50, respectively, which are disposed adjacent each other.

First tab 40 is defined by a free front edge 42 which preferably extends generally parallel to the hinge line of the panel, a rear hinge line 44, which may be perforated and which also preferably extends parallel to the hinge line of the panel, and free side edges 46 which connect the ends of the front and rear edges.

In a similar manner second tab 50 is defined by a free front edge 52, which preferably extends generally parallel to the hinge line of the panel, a rear edge 54 which is hinged to the panel on a hinge line preferably extending generally parallel to the hinge line of the panel, and free side edges 56 which interconnect the ends of the front and rear edges of the tab.

As front edge 52 of tab 50 is shorter than front edge 42 of tab 40, there are provided a pair of opposed shoulders 58 in panel 32 adjacent opposite sides of tabs 40 and 50.

Outer closure panel 36 is divided, in a manner hereinafter described into a fixed tab 60, a partially detachable or releasable tab 70, and a remaining portion 80.

Fixed tab 60 is defined by a free front edge 62, a rear edge 64 which is hinged to the remaining portion 80 of the panel 36, and free side edges 66 which connect the ends of the front and rear edges of the tab. Preferably both the front and rear edges extend in the same general direction as the hinged line of the panel.

The partially detachable tab 70 is defined by a free front edge 72, a rear edge 74 which is hinged to side walls 16 and is the same hinge line which constitutes the hinge line of panel 36, and a pair of free side edges 76 which interconnect the ends of the front and rear edges of the tab. It will be noted that sides edges 76 are defined by cuts which form weakened lines of tear to permit the tab to be detached from the remaining portion 80 of the panel 36 merely by pulling or tearing the tab away. The tab still remains attached to side walls 16 however.

It will be understood that normally the carton will be formed and glued as a tube by the carton manufacturer and shipped to the user in that condition. The user, after closing and gluing the bottom end of the carton, will fill the carton and then close the top end of the carton in the manner hereinafter described.

In closing the carton closure flaps 30 and 34 are folded into the carton, as shown in FIGURE 1, and inner closure panel 32 is folded over at right angles to side wall 12 to overlie closure flaps 30 and 34. Outer closure panel 36 is then folded at right angles to side wall 16 to overlie inner closure panel 32. The glue pattern 38, as illustrated in FIGURE 1, permits the inner and outer panels to be adhesively secured to each other in the areas of the panels other than where the locking tabs of the respective panels are located.

To open the carton, outer panel fixed tab 60 is depressed to permit the insertion of a finger under detachable tab 70 which is then pulled up and ripped away from the remaining portion 80 of the outer panel. At this point the remaining portions of all of the panels and flaps can be lifted to open the carton. Upon reclosure of the carton, flaps 30 and 34 are again folded at right angles to side walls 10 and 12 and inner closure panel 32 is folded at right angles to side wall 12 to overlie flaps 30 and 34. At this point it will be understood that the remaining portion 80 of outer closure panel 36 is bonded to the corresponding surface of inner closure panel 32 and therefore is in effect a part of the panel. Thus the only remaining portion of the original outer panel 32 is the detachable tab 70 which is then folded down to overlie inner panel 32 and then is depressed past the plane of panel 32 to the point at which the front edge 72 is permitted to override the front edge of inner panel second tab 40 and slip past shoulders 58 and between the abutting front edges 52 and 42 of the second and first tabs respectively of inner closure panel 32. Thus the front portion of detachable tab 70 remains locked in position under inner closure panel second tab 50 and shoulders 58 to secure the top of the carton.

Thereafter the carton may be opened and closed on numerous occasions, and always the locking arrangement is available for reclosure of the carton.

I claim:

1. In a folding carton formed from a unitary blank of foldable paperboard and including a plurality of walls interconnected to form a box-like structure having an opening at one side thereof, reclosable means for closing said opening, comprising:

(a) inner and outer closure panels hinged to corresponding edges of opposed walls and folded normally thereto into overlapped relation across substantially the entire area of said opening;

(b) said inner closure panel having formed therein a pair of opposed first and second locking tabs hinged thereto and defined by:

(i) free front edges which have abutting portions extending generally parallel to the hinge line of said panel;

(ii) rear edges hinged to said panel on hinge lines which are spaced from each other a distance equal to the combined lengths of the tabs and which extend generally parallel to the hinge line of said panel;

(iii) free side edges extending between corresponding ends of their respective front and rear edges;

(c) said outer closure panel having formed therein a pair of opposed fixed and partially detachable locking tabs;

(d) said detachable locking tab being defined by:

(i) a free front edge;

(ii) a rear edge hinged to the carton on the hinge line of said panel;

(iii) a pair of side edges extending between corresponding ends of its front and rear edges; said side edges being detachably joined to the remainder of said panel;

(e) said fixed tab being defined by:

(i) a free front edge disposed adjacent the free front edge of said detachable tab;

(ii) a rear edge hinged to said panel;

(iii) a pair of free side edges extending between corresponding ends of its front and rear edges;

(f) the tabs of said outer closure panel being disposed to overlie the tabs of said inner closure panel; certain remaining portions of said panels being adhesively joined together;

(g) said carton being openable by the detachment of said outer closure panel side edges from the remainder of said panel and being reclosable by the insertion of the free front edge of said detachable tab between the abutting front edges of the inner closure panel tabs and under one of the tabs of said inner closure panel.

2. In a folding carton formed from a unitary blank of foldable paperboard and including a plurality of walls interconnected to form a box-like structure having an opening at one side thereof, reclosable means for closing said opening, comprising:

(a) inner and outer closure panels hinged to corresponding edges of opposed walls and folded normally thereto into overlapped relation;

(b) said inner closure panel having formed therein a pair of opposed first and second locking tabs hinged thereto and defined by:

(i) free front edges which have abutting portions;

(ii) rear edges hinged to said panel on hinge lines which are spaced from each other a distance equal to the combined lengths of the tabs;

(iii) free side edges extending between corresponding ends of their respective front and rear edges;

(c) said outer closure panel having formed therein a pair of opposed fixed and partially detachable locking tabs;

(d) said detachable locking tab being defined by:

(i) a free front edge;

(ii) a rear edge hinged to the carton on the hinge line of said panel;

(iii) a pair of side edges extending between corresponding ends of its front and rear edges; said side edges being detachably joined to the remainder of said panel;

(e) said fixed tab being defined by:

(i) a free front edge disposed adjacent the free front edge of said detachable tab;

(ii) a rear edge hinged to said panel;

(iii) a pair of free side edges extending between corresponding ends of its front and rear edges;

(f) the tabs of said outer closure panel being disposed to overlie the tabs of said inner closure panel; certain remaining portions of said panels being adhesively joined together;

(g) said carton being openable by the detachment of said outer closure panel side edges from the remainder of said panel and being reclosable by the insertion of the free front edge of said detachable tab between the abutting front edges of the inner closure panel tabs and under one of the tabs of said inner closure panel.

3. In a folding carton formed from a unitary blank of foldable paperboard and including a plurality of walls interconnected to form a box-like structure having an opening at one side thereof, reclosable means for closing said opening, comprising:

(a) inner and outer closure panels hinged to corresponding edges of opposed walls and folded normally thereto into overlapped relation;

(b) said inner closeure panel having formed therein a pair of opposed first and second locking tabs hinged thereto and defined by:

(i) free front edges which have adjacent portions;

(ii) rear edges hinged to said panel on hinge lines which are spaced from each other a distance equal to the combined lengths of the tabs;

(iii) free side edges extending between corresponding ends of their respective front and rear edges;

(c) said outer closure panel having formed therein a pair of opposed fixed and partially detachable locking tabs;

(d) said detachable locking tab being defined by:

(i) a free front edge;

(ii) a rear edge hinged to the carton;

(iii) a pair of side edges extending between corresponding ends of its front and rear edges; said side edges being detachably joined to the remainder of said panel;

(e) said fixed tab being defined by:

(i) a free front edge disposed adjacent the free front edge of said detachable tab;

(ii) a rear edge hinged to said panel;

(iii) a pair of free side edges extending between corresponding ends of its front and rear edges;

(f) the tabs of said outer closure panel being disposed to overlie the tabs of said inner closure panel; certain remaining portions of said panels being adhesively joined together;

(g) said carton being openable by the detachment of said outer closure panel side edges from the remainder of said panel and being reclosable by the insertion of the free front edge of said detachable tab between the adjacent front edges of the inner closure panel tabs and under one of the tabs of said inner closure panel.

4. In a folding carton formed from a unitary blank of foldable paperboard and including a plurality of walls interconnected to form a box-like structure having an opening at one side thereof, reclosable means for closing said opening, comprising:

(a) inner and outer closure panels hinged to corresponding edges of opposed walls and folded normally thereto into overlapped relation;

(b) said inner closure panel having formed therein a pair of opposed first and second locking tabs hinged thereto and defined by:

(i) free front edges which have adjacent portions;

(ii) rear edges hinged to said panel on hinge lines which are spaced from each other a distance equal to the combined lengths of the tabs;

(iii) free side edges extending between corresponding ends of their respective front and rear edges;

(c) said outer closure panel having formed therein a partially detachable locking tab;

(d) said detachable locking tab being defined by:

(i) a free front edge;

(ii) a rear edge hinged to the carton on the hinge line of said panel;

(iii) a pair of side edges extending between corresponding ends of its front and rear edges; said side edges being detachably joined to the remainder of said panel;

(e) the tab of said outer closure panel being disposed to overlie the tabs of said inner closure panel; certain remaining portions of said panels being adhesively joined together;

(f) said carton being openable by the detachment of said outer closure panel side edges from the remainder of said panel and being reclosable by the insertion of the free front edge of said detachable tab between the abutting front edges of the inner closure panel tabs and under one of the tabs of said inner closure panel.

5. A folding carton according to claim 4, wherein the front edge of one of said inner closure panel tabs is wider than the front edge of the other to provide shoulders adjacent the sides of said tabs, and wherein the front edge of the detachable tab of said outer closure panel is also disposed under said shoulders upon reclosure of the carton.

6. A folding carton according to claim 4, wherein the side edges of said outer closure detachable tab converge from the hinge line of said detachable tab.

7. In a folding carton formed from a unitary blank of foldable paperboard and including a plurality of walls interconnected to form a box-like structure having an opening at one side thereof, reclosable means for closing said opening, comprising:

(a) inner and outer closure panels hinged to corresponding edges of opposed walls and folded normally thereto into overlapped relation across substantially the entire area of said opening;

(b) said inner closure panel having formed therein a pair of opposed first and second locking tabs hinged thereto and having free front edges with adjacent portions;

(c) said outer closure panel having formed therein a partially detachable locking tab;

(d) said detachable locking tab being defined by:

(i) a free front edge;

(ii) a rear edge hinged to the carton;

(iii) a pair of side edges extending between corresponding ends of its front and rear edges; said side edges being detachably joined to the remainder of said panel;

(e) the tab of said outer closure panel being disposed to overlie the tabs of said inner closure panel; certain remaining portions of said panels being adhesively joined together;

(f) said carton being openable by the detachment of said outer closure panel side edges from the remainder of said panel and being reclosable by the insertion of the free front edge of said detachable tab between the adjacent front edges of the inner closure panel tabs and under one of the tabs of said inner closure panel.

*8. In a folding carton formed from a unitary blank of foldable paperboard and including a plurality of walls interconnected to form a box-like structure having an opening at one side thereof, reclosable means for closing said opening, comprising:*

*(a) inner and outer closure panels hinged to corresponding edges of opposed walls and folded normally thereto into overlapped relation;*

*(b) said inner closure panel having formed therein a pair of opposed first and second locking tabs hinged thereto and defined by hinged lines separated by a cut line and foldable to position said tabs so as to be in partly facing relationship;*

*(c) said outer closure panel having formed therein a pair of locking tabs normally lying in a common plane;*

*(d) the tabs of said outer closure panel being disposed to overlie the tabs of said inner closure panel;*

(*e*) *certain remaining portions of said panels being adhesively joined together and being separable from the tabs of said outer closure panel;*

(*f*) *said carton being openable by the detachment of one of the tabs of said outer closure panel from the remainder of said panel and being reclosable by the insertion of the said one tab of said outer closure panel between the opposed first and second locking tabs of the inner closure panel tabs and under one of the tabs of said inner closure panel.*

*9. In a folding carton according to claim 8 wherein the said one tab of said outer closure panel which is insertable between said opposed tabs is constrained by that portion of said inner closure panel at the ends of said cut line.*

References Cited

The following references, cited by the Examiner, are of record in the patented file of this patent or the original patent.

UNITED STATES PATENTS

| | | |
|---|---|---|
| 1,712,249 | 5/1929 | Byrne. |
| 2,002,005 | 5/1935 | Gottlieb. |
| 2,360,415 | 10/1944 | Gilbert. |
| 3,128,934 | 4/1964 | Jacke. |
| 3,361,327 | 1/1968 | Waldrop. |
| 3,366,311 | 1/1968 | Simpson et al. |
| 3,372,853 | 3/1968 | Rumberger. |

FOREIGN PATENTS

| | | |
|---|---|---|
| 1,419,392 | 10/1965 | France. |

DAVIS T. MOORHEAD, Primary Examiner

U.S. Cl. X.R.

229—17